Patented July 4, 1939

2,164,781

UNITED STATES PATENT OFFICE 2,164,781

AMINO-CARBOXYLIC ACIDS AND A PROCESS OF PREPARING THEM

Carl Platz, Frankfort-on-the-Main, and Johann Rosenbach, Wiesbaden, Germany, assignors to General Aniline Works, Inc., New York, N. Y., a corporation of Delaware No Drawing. Application July 20, 1935, Serial No. 32,466. In Germany July 26, 1934

9 Claims. (Cl. 260—534)

The present invention relates to high-molecular amino-carboxylic acid nitriles and amino carboxylic acids, respectively, and to a process of preparing them.

We have found that high-molecular aminocarboxylic acid nitriles and, by saponifying them, the corresponding aminocarboxylic acids are obtainable with a good yield by causing formaldehyde and hydrocyanic acid or compounds capable of splitting off formaldehyde and hydrocyanic acid, respectively, to act upon high molecular compounds, containing amino groups, which as aliphatic or aliphatic-aromatic compounds contain at least one aliphatic radical with at least 6 carbon atoms in the molecule or as cycloaliphatic or hydroaromatic compounds have at least one side chain of not less than 3 carbon atoms, i. e. compounds of the general formula:

wherein $R_1$ stands for H or any organic radical $R_2$ stands for an aliphatic radical with at least 6 carbon atoms or a cyclo-aliphatic or hydroaromatic radical with at least one side chain with not less than 3 carbon atoms; and, if desired, saponifying the nitriles obtained to the corresponding aminocarboxylic acids. The process is not limited to the use of formaldehyde or compounds splitting off formaldehyde. There may also be used other aldehydes such as, for instance, acetaldehyde and homologues thereof, or benzaldehyde or ketones, for instance, acetone, i. e., compounds containing carbonyl groups and corresponding to the formula:

wherein R stands for H or an aliphatic or isocyclic hydrocarbon radical and $R_1$ stands for H or an aliphatic or isocyclic hydrocarbon radical. The process is carried out by mixing in an aqueous medium, for instance, the aldehyde such as formaldehyde or another aldehyde or an aldehyde- or ketone-like body such as glucose with the base and causing hydrocyanic acid to act upon the mixture at ordinary or raised temperature. Instead of an aldehyde there may also be used substances which are capable of splitting off an aldehyde, such as formaldehyde, for instance, formaldehyde-bisulfite; on the formaldehyde-bisulfite there is caused to act, for instance, a primary amine base and then hydrocyanic acid or a salt of hydrocyanic acid in an aqueous medium. The nitrile-amine is obtained in a smooth reaction. When using a salt of a hydrocyanic acid it is advantageous to raise the temperature a little but not over 100° C. The nitrile-amine is saponified according to one of the usual methods into the corresponding amino-carboxylic acid.

For the present process there may be used with advantage, for instance, the following amines: hexylamine, decylamine, undecylamine, dodecylamine, oleylamine, octadecylamine, dodecylglucamine, furthermore, amines obtainable from montanic acids, resin acids and naphthenic acids. There may also be used diamines containing a high molecular radical, for instance, the dodecyldiethylethylenediamine $$C_{12}H_{25}.NH.C_2H_4.N.(C_2H_5)_2.$$

Amino carboxylic acids such as the dodecyl amino acetic acid, octadecylamino propionic acid, may also be used for the reaction furthermore, technical amine mixtures obtainable, for instance, from natural fats or fatty acid mixtures or fish oils by transformation into fatty acid nitriles and reduction of the latter to the amines.

The new bodies of which the nitriles are oily to solid feebly yellow substances, insoluble in water and the aminocarboxylic acids are colorless powders difficultly soluble in water shall serve as intermediate products for the manufacture of assistants in the textile industry.

The following examples serve to illustrate the invention, but they are not intended to limit it thereto; the parts are by weight:

(1) In the course of 1 hour 100 parts of a formaldehyde solution of 30 per cent. strength are added to 100 parts of pure hexylamine; thereupon, 30 parts of anhydrous hydrocyanic acid are added, drop by drop at 0° C. to 10° C.; the whole is stirred at this temperature for 2 hours and thereupon heated for 1 hour at 30° C. The mixture is extracted with ether whereby the nitrile of the hexylamino-acetic acid is obtained.

(2) 200 parts of a formaldehyde solution (of 30 per cent. strength) and 500 parts of sodium bisulfite solution (of 38 per cent. strength) are mixed together and 370 parts of dodecylamine (of 100 per cent. strength) are added thereto. The whole is kept at a temperature of 50° C. to 60° C. for half-an-hour and, thereupon, the solution of 180 parts of sodium cyanide (of 80 per cent. strength) in 800 parts of water is added thereto; the whole is stirred for 1 hour at 70° C. to 80° C.

The nitrile may be saponified in the following manner: 600 parts of caustic soda solution (of 35 per cent. strength) are added to the reaction product and the mixture is heated for 4 hours at 90° C. It is then acidified with dilute sulfuric acid solution; a sodium acetate solution is added until the reaction to Congo paper has disappeared; the precipitated dodecylaminoacetic acid is filtered with suction, the solid matter is washed with water and dried. The yield amounts to about 90 per cent. The dodecylaminoacetic acid may also be purified by recrystallization from alcohol.

(3) 130 parts of a sodium bisulfite solution (of 38 per cent. strength) are added to 50 parts of a formaldehyde solution of 30 per cent. strength and this mixture is run in the course of ¼ hour at 70° C. to 80° C. to 135 parts of octadecylamine (technical), the whole is stirred at 70° C. to 80° C. for 1 hour; a solution of 35 parts of sodium cyanide in 200 parts of water is added thereto and the whole is stirred for 2 hours at 80° C. to 90° C.

The nitrile of the octadecylaminoacetic acid may be converted by saponification into the actadecylaminoacetic acid, as described in Example 2.

(4) A solution of 134 parts of formaldehyde bisulfite in 300 parts of water is added to 258 parts of oleylamine. The whole is heated for half-an-hour at 50° C. to 60° C. and, thereupon, a solution of 65 parts of potassium cyanide (of 100 per cent. strength) in 200 parts of water is added. The whole is stirred for 1½ to 2 hours at 80° C. to 90° C.

(5) A mixture of 100 parts of formaldehyde solution of 30 per cent. strength and 260 parts of sodium-bisulfite solution (of 38 per cent. strength) is added to 141 parts of para-isopropylcyclohexylamine and heated for half-an-hour at 40° C. to 50° C., while stirring. Thereupon, a solution of 66 parts of sodium cyanide (of 80 per cent. strength) in 200 parts of water is run thereto and stirring is continued for 2 hours at 70° C. to 80° C. The nitrile of the isopropylcyclohexylamino acetic acid may be isolated by extraction with ether and by saponification of the nitrile the isopropylcyclohexylamino acetic acid may be obtained.

(6) 260 parts of a sodium bisulfite solution (of 38 per cent. strength) are added to 100 parts of a formaldehyde solution of 30 per cent. strength; thereupon, 199 parts of methyldodecylamine are added. The mixture is heated for half-an-hour, while stirring, at 50° C. A solution of 75 parts of potassium cyanide in 125 parts of water is added and stirring is then continued for 2 hours at 70° C. to 80° C. The nitrile of the methyldodecylamino acetic acid separates in the form of an oil and may be converted into the acid by saponification with sodium hydroxide as described in Example 2.

(7) A mixture of 53 parts of benzaldehyde and 130 parts of a sodium bisulfite solution (of 38 per cent. strength) is added to 92 parts of melted dodecyl-amine, while stirring. It is heated for half-an-hour at 50° C. to 60° C., a solution of 33 parts of sodium cyanide in 100 parts of water is then added and the whole is then stirred for 2 hours at 70° C. to 80° C. By saponifying the nitrile obtained, as described in Example 2, the dodecylamino-phenylacetic acid is obtained.

(8) A mixture of 260 parts of sodium bisulfite solution (of 38 per cent. strength) and 44 parts of acetalydehyde is added, while stirring at 50° C., to 270 parts of octadecylamine (technical) and stirring is continued at this temperature for 15 minutes. A solution of 65 parts of sodium cyanide (of 80 per cent. strength) in 200 parts of water is then added and a temperature of 80° C. is maintained for 2 hours during which period the nitrile of the octadecylaminomethylacetic acid separates in the form of an oil; by saponifying the nitrile, the carboxylic acid is obtained.

(9) A mixture of 130 parts of sodium bisulfite solution (of 38 per cent. strength) and 28 parts of acetone is added to 92 parts of dodecyl-amine. A temperature of 40° C. to 50° C. is maintained, while stirring, for half-an-hour; thereupon, a solution of 35 parts of sodium cyanide (of 80 per cent. strength) in 100 parts of water is run thereinto. Stirring is continued for 2 hours at about 80° C. until the nitrile of the dodecylamino-dimethylacetic acid separates in the form of an oil. The nitrile may be converted into the acid by saponification.

We claim:

1. The products of the general formula:

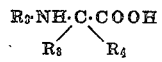

wherein $R_2$ represents an aliphatic hydrocarbon radical with at least 6 carbon atoms, $R_3$ represents a member of the group consisting of hydrogen, aliphatic and isocyclic radicals, $R_4$ represents a member of the group consisting of hydrogen, aliphatic and isocyclic radicals.

2. The products of the general formula:

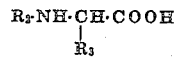

wherein $R_2$ represents an aliphatic hydrocarbon radical with at least 6 carbon atoms, and $R_3$ represents a member of the group consisting of hydrogen, aliphatic and isocyclic radicals.

3. The products of the general formula:

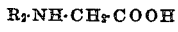

wherein $R_2$ represents an aliphatic hydrocarbon radical with at least 6 carbon atoms.

4. The dodecylamino-acetic acid having the formula:

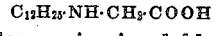

being a colourless water-insoluble powder.

5. The octadecylamino-acetic acid having the formula:

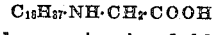

being a colourless water-insoluble powder.

6. The oleylamino-acetic acid having the formula:

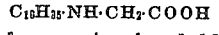

being a colourless water-insoluble powder.

7. The products of the general formula:

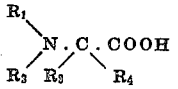

wherein $R_1$ represents a member of the group consisting of hydrogen and aliphatic hydrocarbon radicals, $R_2$ represents a member of the group consisting of aliphatic hydrocarbon radicals with at least 6 carbon atoms and cycloaliphatic or hydroaromatic radicals with a side-chain with at least 3 carbon atoms, $R_3$ represents a member of the group consisting of hydrogen, aliphatic and isocyclic radicals, $R_4$ represents a member of the group consisting of hydrogen, aliphatic and isocyclic radicals, the products being colorless water-insoluble powders.

8. The products of the general formula:

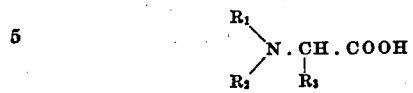

wherein $R_1$ represents a member of the group consisting of hydrogen and aliphatic hydrocarbon radicals, $R_2$ represents a member of the group consisting of aliphatic hydrocarbon radicals with at least 6 carbon atoms and cycloaliphatic or hydroaromatic radicals with a side-chain with at least 3 carbon atoms, $R_3$ represents a member of the group consisting of hydrogen, aliphatic and isocyclic radicals, the products being colorless water-insoluble powders.

9. The products of the general formula:

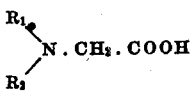

wherein $R_1$ represents a member of the group consisting of hydrogen and aliphatic hydrocarbon radicals, $R_2$ represents a member of the group consisting of aliphatic hydrocarbon radicals with at least 6 carbon atoms and cycloaliphatic or hydroaromatic radicals with a side-chain with at least 3 carbon atoms, the products being colorless water-insoluble powders.

CARL PLATZ.
JOHANN ROSENBACH.